United States Patent
Link

(10) Patent No.: US 7,631,951 B2
(45) Date of Patent: Dec. 15, 2009

(54) HYDRAULIC SYSTEM FOR LIMITED WHEEL SLIP OF TRACTION DRIVE SYSTEM

(75) Inventor: Todd Allen Link, Apex, NC (US)

(73) Assignee: Deere & Company, Moline, IL (US)

( * ) Notice: Subject to any disclaimer, the term of this patent is extended or adjusted under 35 U.S.C. 154(b) by 406 days.

(21) Appl. No.: 11/581,857

(22) Filed: Oct. 17, 2006

(65) Prior Publication Data

US 2008/0100130 A1 May 1, 2008

(51) Int. Cl.
*B60T 8/34* (2006.01)
*F15B 13/06* (2006.01)

(52) U.S. Cl. ..................... 303/113.2; 60/426

(58) Field of Classification Search ............... 303/121, 303/151; 60/425–427; 180/305–308
See application file for complete search history.

(56) References Cited

U.S. PATENT DOCUMENTS

| | | | |
|---|---|---|---|
| 3,713,708 A * | 1/1973 | Michellone et al. ...... 303/119.1 |
| 4,769,991 A | 9/1988 | Johnson | |
| 5,114,216 A * | 5/1992 | Tsuda et al. ............. 303/117.1 |
| 5,560,204 A * | 10/1996 | Ishihama et al. .............. 60/426 |
| 5,857,330 A * | 1/1999 | Ishizaki et al. ................ 60/426 |
| 5,915,496 A | 6/1999 | Bednar et al. | |
| 6,073,716 A | 6/2000 | Ellertson et al. | |
| 6,119,802 A | 9/2000 | Puett, Jr. | |
| 6,662,557 B1 * | 12/2003 | Cunningham et al. ......... 60/425 |
| 2005/0031460 A1* | 2/2005 | Perry ......................... 417/307 |

FOREIGN PATENT DOCUMENTS

| EP | 1 079 153 | 10/2004 |
|---|---|---|
| WO | 03/048587 | 6/2003 |

* cited by examiner

*Primary Examiner*—Christopher P Schwartz

(57) ABSTRACT

A hydraulic system for limited wheel slip of a traction drive system includes first and second pilot directional valves between a hydraulic pump and first and second hydraulic wheel motors. If a wheel slips, the first or second pilot directional valves moves to a first position directing some hydraulic fluid through a restricted passage to the slipping motor and the remainder through an unrestricted passage to the opposite motor. Absent wheel slip, the pilot directional valve is in a second position directing all of the hydraulic fluid through an unrestricted passage to the corresponding motor. The first and second pilot directional valves detect wheel slippage and move between the first and second positions based on a first pilot signal corresponding to the pressure sensed entering the respective pilot directional valve, which is balanced against a biased spring and a second pilot signal from the opposite motor.

14 Claims, 3 Drawing Sheets

HYDRAULIC SYSTEM FOR LIMITED WHEEL SLIP OF TRACTION DRIVE SYSTEM

FIELD OF THE INVENTION

This invention relates generally to traction drives used on machines with hydraulic pumps and wheel motors. More specifically, the invention relates to a hydraulic system for limited wheel slip of a traction drive system for a grass mowing machine or similar vehicle, to improve traction and hill climbing capabilities.

BACKGROUND OF THE INVENTION

Grass mowing machines and similar vehicles may have hydraulic traction drive systems designed for improved traction of the machine. Several hydraulic traction drive systems are intended to prevent or limit wheel slip and optimize the machine's traction and hill climbing capability, while maintaining its performance and functionality.

For example, one type of hydraulic system intended for improved traction includes valving to control the flow and/or pressure being distributed to each of the wheel motors. U.S. Pat. No. 6,073,716 relates to such a hydraulic traction drive system having velocity fuses to stop the flow of hydraulic fluid to the slipping wheel. Such a system has advantages, but may cause instability in the system because the valves open and close flow passages in an on/off fashion. By relying on the flow induced pressure signals, such a system would not perform adequately under low flow conditions. Additionally, in rear steered vehicles, the vehicle dynamics in turns can cause false wheel slip signals to the fuses, causing unwanted reactions, especially if flow is curtailed to the outside wheel. While relying on the pressure differential across the valve caused by flow, there could be no signal on the wheel motor side of the valve to cause the valve to reopen allowing the wheel motor to regain drive.

Alternatively, another type of hydraulic system having a valving arrangement intended to improve traction includes speed sensors at the wheel motors, and proportional valves to meter the flow to the individual motors. When sudden wheel speed change is sensed, the valve meters the hydraulic flow to the respective wheel. However, the cost of such a system requiring sensors, valves and a controller is not feasible for many applications.

Another hydraulic traction drive system includes a flow divider or flow regulator to divert hydraulic flow away from a slipping wheel. Unfortunately, on front wheel drive machines, during a turn, the flow divider or flow regulator may divert flow away from the outside wheel, causing that wheel to stall which may prevent the machine from turning effectively. This type of hydraulic circuit may be used feasibly as an on demand differential lock activated by the operator. However, flow dividers also may be relatively high generators of heat within a hydraulic system, which is a nondesireable condition.

Another hydraulic traction drive system to limit wheel slip involves configuring the wheel motors into a parallel-series circuit. For example, U.S. Pat. No. 5,915,496 relates to a parallel-series four wheel drive hydraulic circuit for a riding lawn mower. However, a parallel-series circuit will not work effectively on a two-wheel drive machine. Also, in four-wheel drive vehicles, especially on front axle driven machines, a parallel-series system requires more horsepower to climb a hill when compared to a parallel circuit. This is due to the inherent sizing of the wheel motor displacements and the limited pressure to the second motor in series due to the pressure drop across the first motor.

SUMMARY OF THE INVENTION

A hydraulic system for limited wheel slip of a traction drive system includes a pair of pilot directional valves between the pump and wheel motors. Each pilot directional valve has unrestricted and restricted passages. If a wheel slips, the pilot directional valve for the slipping motor moves toward a first position, so that flow is through the restricted passage to the slipping motor. If the wheel does not slip, the pilot directional valve moves toward a second position in which the unrestricted passage is open to that motor. Pressure is sensed at the inlet to each valve, and a first pilot signal urges the pilot directional valves toward the second position based on the variable pressure. The magnitude of the first pilot signal is balanced against a biased spring and a second pilot signal from the opposite motor.

DESCRIPTION OF THE PREFERRED EMBODIMENT

Figure 1:
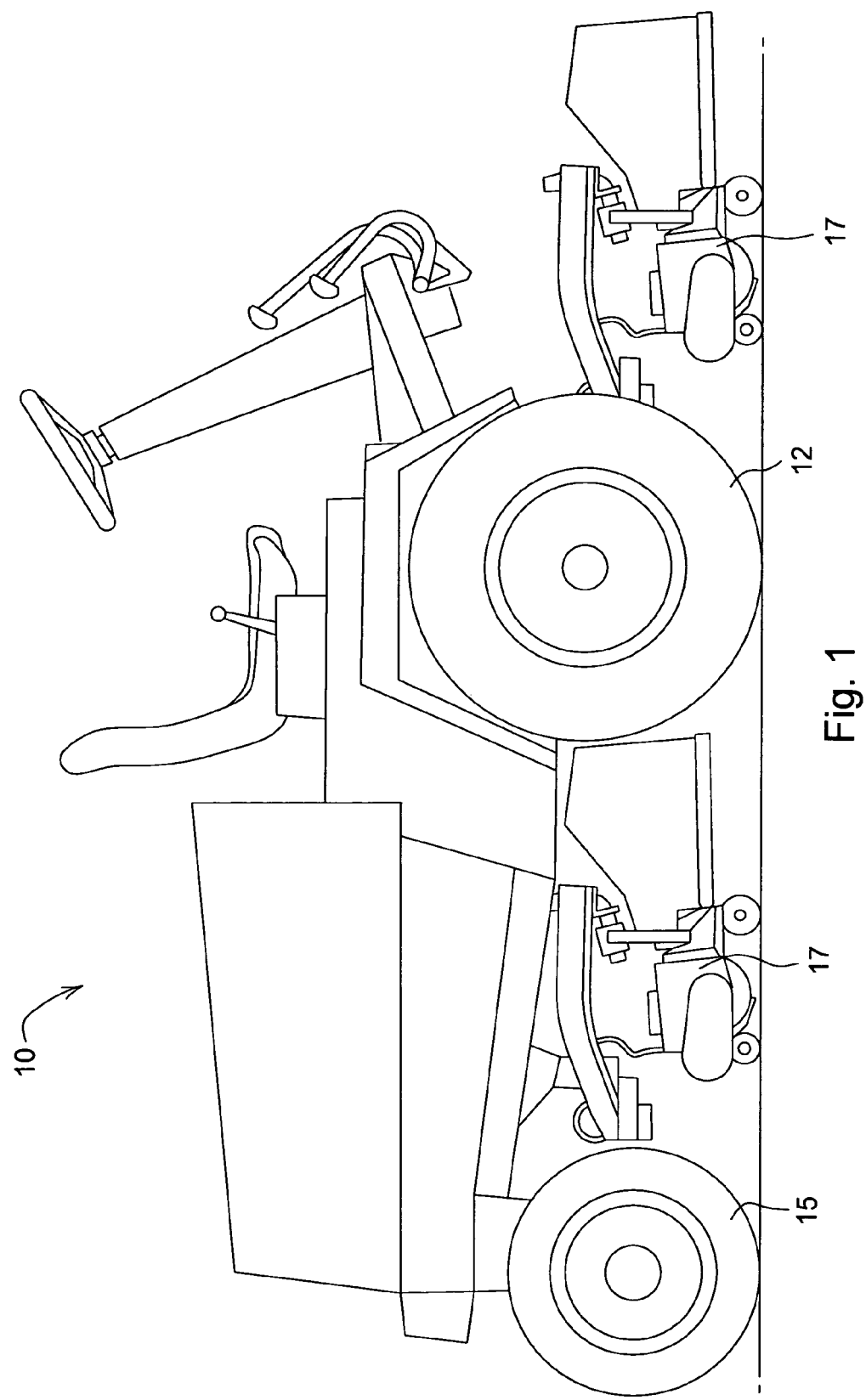
FIG. 1 is a side view of a grass mowing machine that may include a hydraulic system for limited wheel slip of a traction drive system system according to a first embodiment of the invention.

FIG. 1 shows grass mowing machine 10 that may be provided with a hydraulic system for limited wheel slip of a traction drive system. The grass mowing machine may have a pair of front wheels 12 for traction drive and one or more steered rear wheels 15. The hydraulic system for limited wheel slip may be used on two-wheel, three-wheel or four-wheel grass mowing machines that have hydraulic pumps and wheel motors for traction drive. The hydraulic system for limited wheel slip may be provided on grass mowing machines including mowers with reel-type cutting units 17 typically used to mow golf courses and athletic fields, including but not limited to trim mowers, greens mowers, and fairway mowers. The system also may provided on other grass mowing machines having rotary cutting units.

Figure 2:
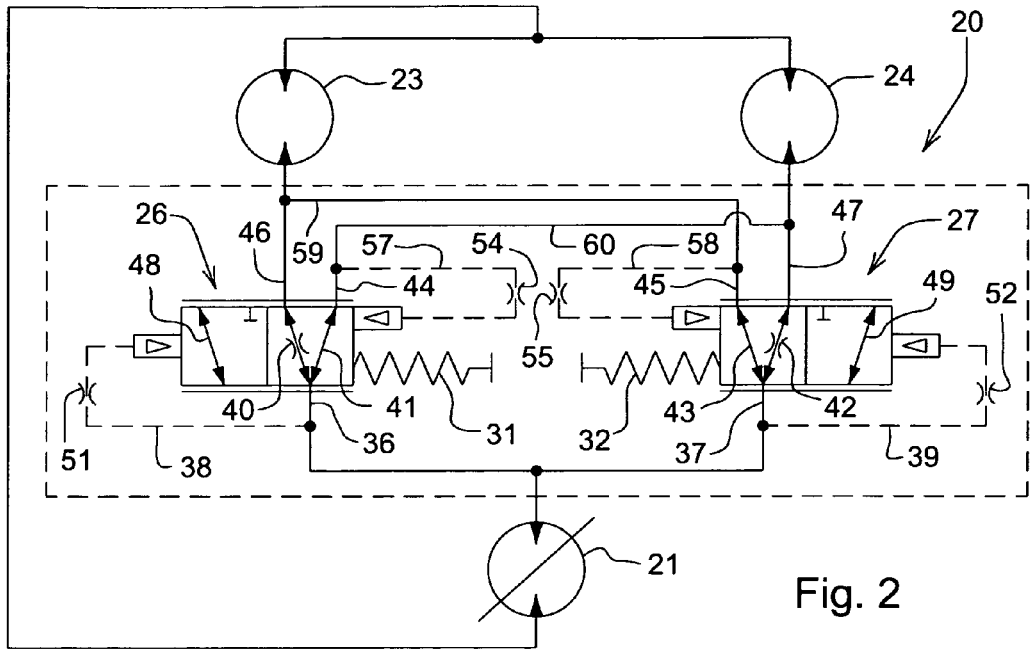
FIG. 2 is a schematic diagram of a hydraulic system for limited wheel slip of a traction drive system according to a first embodiment of the invention, with the pilot directional valves in a first position.
Figure 3:
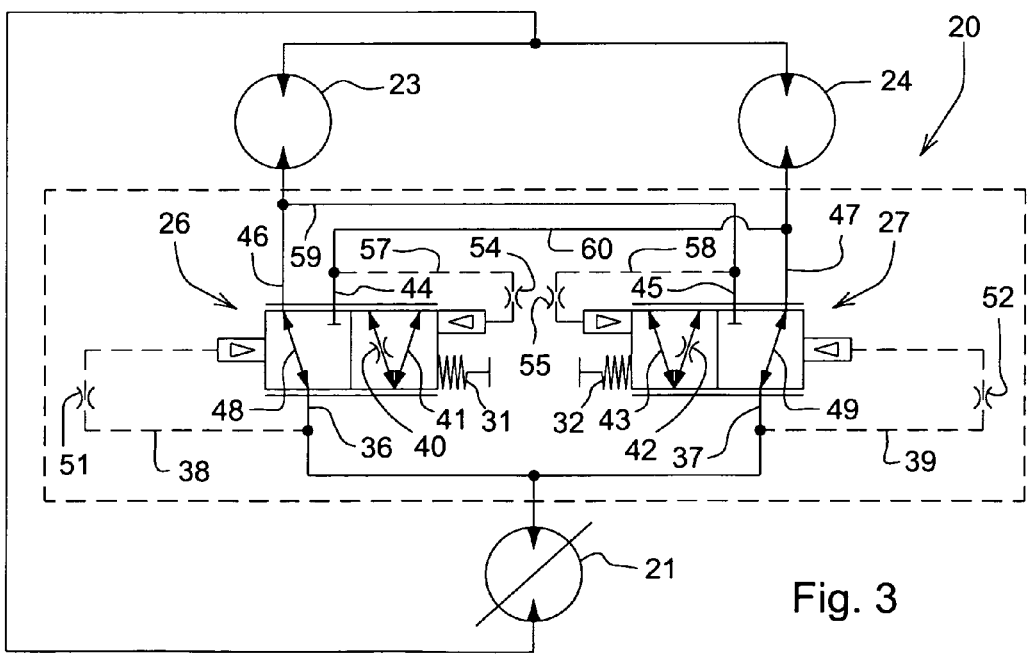
FIG. 3 is a schematic diagram of a hydraulic system for limited wheel slip of a traction drive system according to a first embodiment of the invention, with both pilot directional valves in an second position.
Figure 4:
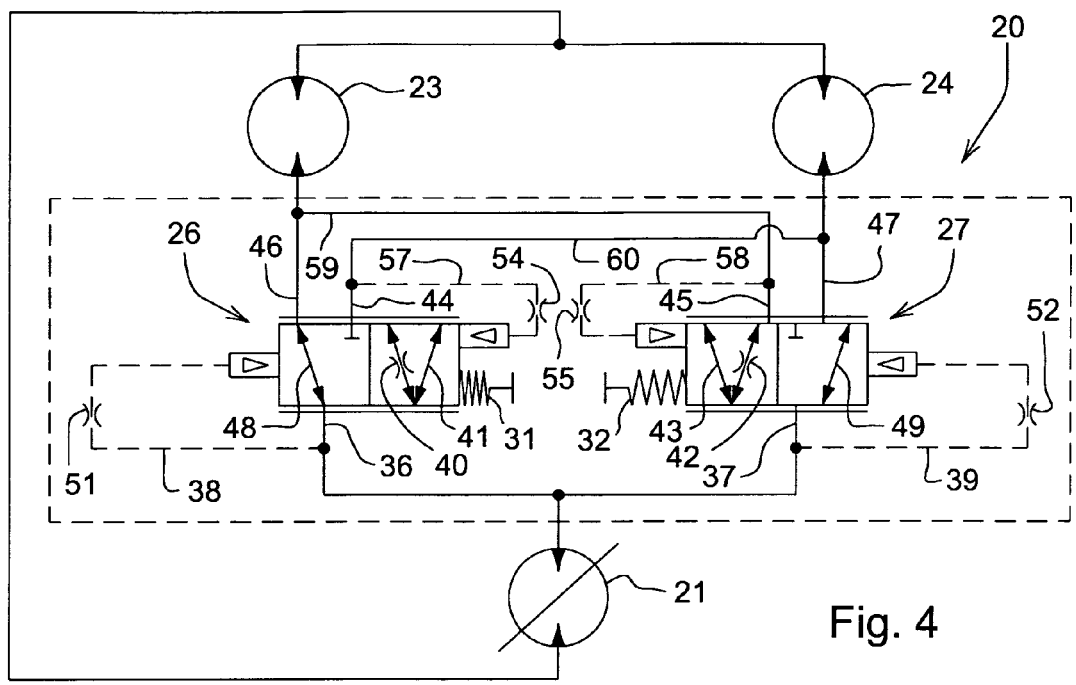
FIG. 4 is a schematic diagram of a hydraulic system for limited wheel slip of a traction drive system according to a first embodiment of the invention, with one of the pilot directional valves in the second position position, and the other valve between the first and second positions.

In the embodiment shown in FIGS. 2-4, hydraulic circuit 20 may be provided between hydraulic pump 21 and left and right hydraulic wheel motors 23, 24. Hydraulic circuit 20 may include pilot directional valves 26, 27. In a preferred embodiment, the pilot directional valves may be spool valves that provide proportional flow anywhere between a first and a second position. The pilot directional valves manage flow distribution between hydraulic wheel motors 23, 24 by sensing the variable pressure at inlet ports 36, 37, and balancing a first pilot signal associated with the level of the sensed pressure at the inlet ports against the bias force of springs 31, 32, and second pilot signals associated with sensed pressure of the opposite pilot directional valves.

In FIG. 2, pilot directional valves 26, 27 are shown in a first position, which may be neutral or reverse. In the first position, some of the hydraulic fluid enters inlet ports 36, 37 and flows through restricted passages 40, 42 to outlets 46, 47 connected to motors 23, 24, and the remainder of the hydraulic fluid flows through unrestricted passages 41, 43 to first outlets 44, 45 connected to the opposite motor.

FIG. 3 shows both pilot directional valves 26, 27 in the second, unrestricted flow position, which may be the full forward position. Each pilot directional valve may provide proportional flow at any position between the first position shown in FIG. 2 and a second position shown in FIG. 3.

In one embodiment, pump 21 provides flow of pressurized hydraulic fluid to inlet ports 36, 37 of pilot directional valves 26, 27. The level or magnitude of hydraulic fluid pressure entering valves 26, 27 may be sensed at inlet ports 36, 37. The sensed hydraulic fluid pressure at inlet ports 36, 37 is variable and is provided as a first pilot signal through first pilot lines 38, 39 urging pilot directional valves 26, 27 toward the second position. Each of the first pilot lines may include a buffer or dampening orifice 51, 52.

In one embodiment, as pressure builds up between the valves 26, 27 and motors 23, 24, the first pilot signals urge the valves toward the second positions. To move the valves toward their second positions, the magnitude of the first pilot signals must exceed the bias force of springs 31, 32, and second pilot signals from the opposite motor. The sensed hydraulic fluid pressure at outlet ports 44, 45 of the opposing motors are variables that are provided as second pilot signals, and may be provided through pilot lines 57, 58 having buffers or dampening orifices 54, 55. In the unrestricted flow positions, only the unrestricted passages 48, 49 through valves 26, 27 are open to the primary motors, and the restricted passages 40, 42 are closed.

As shown in FIG. 4, if one of the traction drive wheels slips, the first pilot signal at the respective pilot directional valve may be decreased and may be overcome by the spring bias and the second pressure signal from the opposite motor. As a result, the valve for the slipping wheel may move partially toward the first position. For example, pilot directional valve 27 is shown partially moved toward the first position due to slippage of the traction drive wheel of motor 24. Pilot directional valve 27 moves toward the first position if the wheel turned by wheel motor 24 slips, decreasing hydraulic pressure sensed at inlet port 37. Due to lower hydraulic pressure at inlet port 37, the first pressure signal through pilot line 39 may be exceeded by the bias force of spring 32 combined with the second pressure signal from the opposite motor, at outlet port 45 through pilot line 58. If the valve moves toward the first position, it gradually opens restricted passage 42 between inlet port 37 and outlet port 47, causing a pressure drop across valve 27 and reducing the pressure delivered to the slipping wheel. As a result, system pressure is maintained and nonslipping motor 23 can retain pressure and continue producing torque to drive the machine forward.

From its position in FIG. 4, pilot directional valve 27 can return again to the second position in FIG. 3 if the first pressure signal at inlet port 37 increases enough to overcome the bias force of spring 32 and the second pressure signal from motor 23. Moving valve 27 toward the second position increases pressure at outlet port 47. This metering cycle may continue until motor 24 can maintain full system pressure.

In one embodiment, as shown in FIG. 2, in the first position, the restricted passages 40, 42 are open to outlet ports 46, 47 to the primary motors 23, 24, and the unrestricted flow passages 41, 43 are open to outlet ports 44, 45 to the opposite motors. As shown in FIG. 3, in the second position, only the unrestricted flow passages 48, 49 through valves 26, 27 are open to outlet ports 46, 47 to motors 23, 24, and the restricted passages to outlet ports 44, 45 are closed. Preferably, the pilot directional valves are proportional valves so that hydraulic flow is proportional through the restricted and unrestricted passages based on the valve position.

In one embodiment, the hydraulic system for limited wheel slip may be used on a front axle driven mowing machine such as that shown in FIG. 1. The hydraulic system assures that hydraulic flow is available to both motors 23, 24 during turns because pilot directional valves 26, 27 include cross ports 59, 60 to each motor. Cross porting helps prevent stalling or cavitation of the motors. Additionally, if dynamic braking or reverse flow is required from the hydraulic system, pilot directional valves 26, 27 allow sufficient flow to both wheel motors 23, 24.

In one embodiment, the hydraulic system for limited wheel slip may use pilot directional valves 26, 27 to control wheel slip between two front motors of a front axle driven machine. Additionally, the hydraulic system may limit wheel slip of a three wheel drive mowing machine having a third powered rear wheel, or two rear drive wheels on a four wheel drive circuit in parallel.

In one embodiment, if the hydraulic system for limited wheel slip is in parallel and full system pressure is applied to all drive motors, the system allows for maximum torque to be produced by the wheel motors, using the formula: torque=pressure×displacement×number of motors. As a result, the hydraulic system for limited wheel slip requires less horsepower to be used for a mowing machine to climb a hill, and maintains the capability to limit wheel slip.

In one embodiment, the hydraulic system for limited wheel slip automatically returns to full forward drive and power distribution when a slipping wheel regains traction. The system limits wheel slip of each drive motor 23, 24 to maintain drive pressure to the drive wheels that have traction. Pilot directional valves 26, 27 sense pressure at inlets 36, 37 of each valve, and the pressure of the opposite wheel. The hydraulic system continuously monitors the condition of the wheel traction once it slips, and removes the flow restriction from the slipping motor when it regains traction. The hydraulic system maximizes wheel motor torque and tractive effort of the system at system pressure, and uses less horsepower to climb a steep incline than a parallel series circuit for a similar weight machine.

Having described a preferred embodiment, it will become apparent that various modifications can be made without departing from the scope of the invention as defined in the accompanying claims.

The invention claimed is:

1. A hydraulic system for limited wheel slip of a traction drive system, comprising:

a hydraulic pump providing hydraulic fluid to a pair of hydraulic wheel motors;

a pair of pilot directional valves between the pump and wheel motors, each pilot directional valve having an inlet and restricted and unrestricted passages between the inlet and one of the motors, each valve moveable between a first position in which hydraulic fluid is directed through a restricted passage to one of the motors and through an unrestricted passage to the other motor and a second position in which hydraulic fluid is directed only through an unrestricted passage to one of the motors; and a first pilot line connected to each inlet providing a variable first pressure signal tending to urge each pilot directional valve toward the second position.

2. The hydraulic system of claim 1 further comprising a second pilot line connected to each pilot directional valve providing a variable second pilot signal tending to urge the valve toward the first position.

3. The hydraulic system of claim 1 further comprising a spring connected to each pilot directional valve urging the valve toward the first position.

4. The hydraulic system of claim 1 further comprising cross ports between the pair of pilot directional valves.

5. The hydraulic system of claim 1 wherein the pilot directional valves are proportional valves.

6. A hydraulic system for limited wheel slip of a traction drive system comprising:
   a hydraulic pump providing hydraulic fluid to first and second hydraulic wheel motors; and
   a hydraulic circuit between the pump and the first and second motors, and having first and second pilot directional valves with valve inlets and being moveable between a first position providing restricted flow through one of the motors and unrestricted flow through the other of the motors, and a second position providing unrestricted flow through one of the motors, each valve being urged toward the second position in the absence of wheel slip based on the hydraulic fluid pressure sensed at the valve inlet.

7. The hydraulic system of claim 6 further comprising a spring urging each pilot directional valve toward the first position.

8. The hydraulic system of claim 6 further comprising a first pilot line connected to each pilot directional valve and providing a first pilot signal associated with hydraulic fluid pressure sensed at the valve inlet, the first pilot signal urging the pilot directional valve toward the second position.

9. The hydraulic system of claim 8 further comprising a second pilot line connected to each pilot directional valve and providing a second pilot signal associated with the hydraulic fluid pressure of the other pilot directional valve, the second pilot signal urging the pilot directional valve toward the first position.

10. The hydraulic system of claim 6 wherein the pilot directional valves are proportional valves.

11. A hydraulic system for limited wheel slip of a traction drive system comprising:
    a hydraulic pump providing hydraulic fluid to first and second hydraulic wheel motors;
    first and second pilot directional valves between the pump and the first and second hydraulic wheel motors;
    the first and second pilot directional valves each being movable between a first position, in which each pilot directional valve directs some hydraulic fluid through a restricted passage to each of the first and second motors respectively and the remainder of the hydraulic fluid through an unrestricted passage to the opposite motor, and
    a second position, in which each pilot directional valve directs all of the hydraulic fluid through an unrestricted passage to the first and second motors respectively;
    the first and second pilot directional valves each being moveable between the first and second positions based on a first pilot signal corresponding to the pressure sensed entering the respective pilot directional valve and balancing the first pilot signal against a biased spring and a second pilot signal from the opposite motor.

12. The hydraulic system of claim 11 wherein each pilot directional valve is a proportional valve.

13. The hydraulic system of claim 11 wherein the first pilot signal is provided through a pilot line having a buffer.

14. The hydraulic system of claim 11 wherein the second pilot signal is provided through a pilot line having a buffer.

* * * * *